United States Patent
Painter et al.

(10) Patent No.: US 6,928,874 B2
(45) Date of Patent: Aug. 16, 2005

(54) DYNAMICALLY AMPLIFIED MICROMACHINED VIBRATORY ANGLE MEASURING GYROSCOPES, MICROMACHINED INERTIAL SENSORS AND METHOD OF OPERATION FOR THE SAME

(75) Inventors: Christopher C. Painter, Irvine, CA (US); Andrei M. Shkel, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 19 days.

(21) Appl. No.: 10/697,359

(22) Filed: Oct. 30, 2003

(65) Prior Publication Data

US 2004/0123661 A1 Jul. 1, 2004

Related U.S. Application Data

(60) Provisional application No. 60/426,772, filed on Nov. 15, 2002.

(51) Int. Cl.[7] .............................................. G01C 19/56
(52) U.S. Cl. .................. 73/504.13; 33/1 PT; 73/504.14
(58) Field of Search ........................ 73/504.02–504.04, 73/504.12, 504.13, 504.14; 33/1 PT

(56) References Cited

U.S. PATENT DOCUMENTS

| | | | | | |
|---|---|---|---|---|---|
| 6,293,148 | B1 | * | 9/2001 | Wang et al. | 73/504.02 |
| 6,393,913 | B1 | * | 5/2002 | Dyck et al. | 73/504.12 |
| 6,481,285 | B1 | * | 11/2002 | Shkel et al. | 73/504.13 |

* cited by examiner

Primary Examiner—Hezron Williams
Assistant Examiner—John C Hanley
(74) Attorney, Agent, or Firm—Daniel L. Dawes; Myers Dawes Andras & Sherman

(57) ABSTRACT

A micromachined angle measuring gyroscope using a dual mass architecture measures angular positions rather than angular rates. The invention decouples the effects of drive and sense through the use of a dual mass architecture, and is comprised of a single lumped drive mass, which is structurally coupled to a second lumped slave mass, where the drive mass is electrostatically driven at the first resonant frequency the system using parallel plate electrodes. The slave mass is driven to higher amplitudes than the drive mass. In the presence of rotation, the line of oscillation in both masses precesses, which is easily detectable in the slave mass due to the amplified motion, and is exactly equal to the angle of rotation. The two illustrated embodiments are z-axis realizations of this principle, where the first device uses an inner drive/outer sense architecture and the second uses an outer drive/inner sense architecture.

30 Claims, 11 Drawing Sheets

FIG. 2a
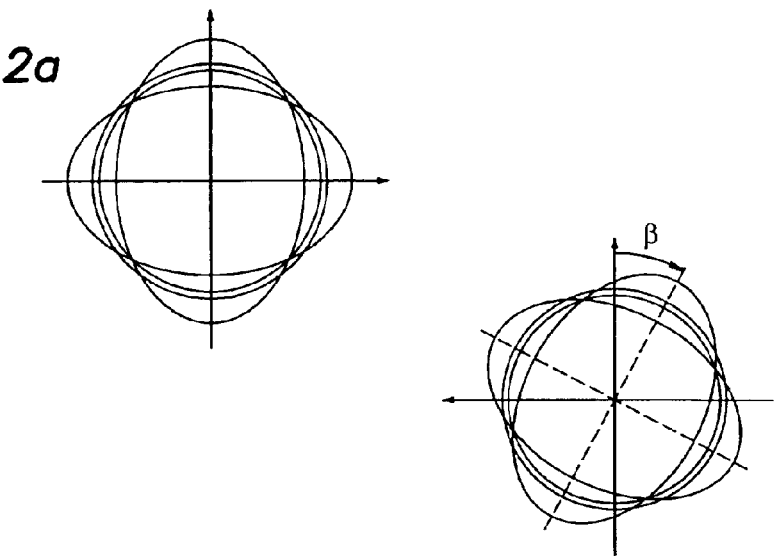
FIG. 2b
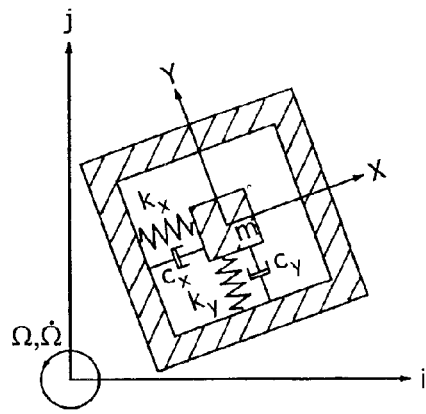
FIG. 2c
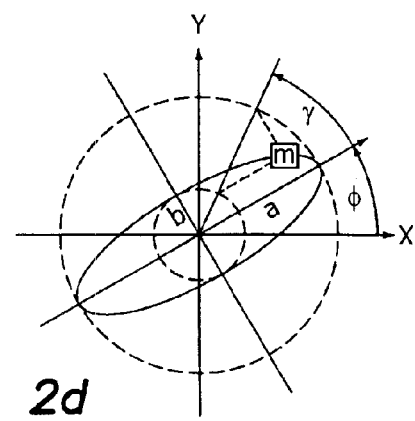
FIG. 2d

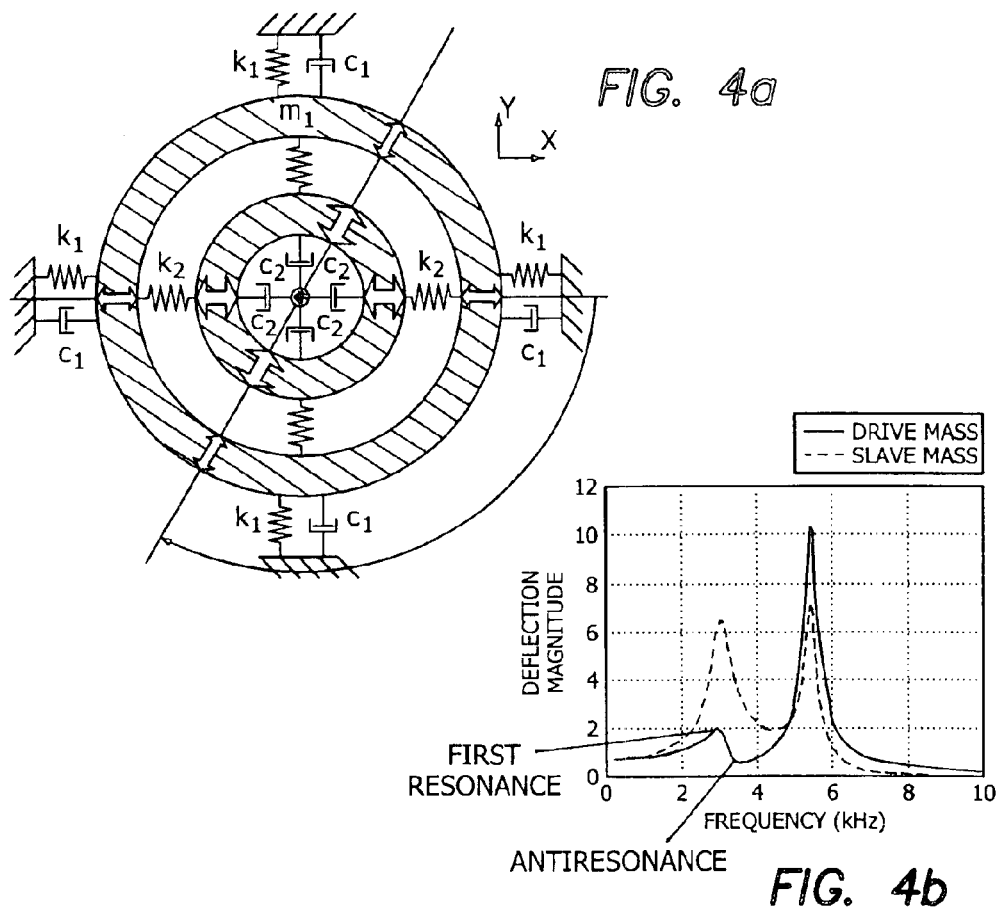
FIG. 4a
FIG. 4b
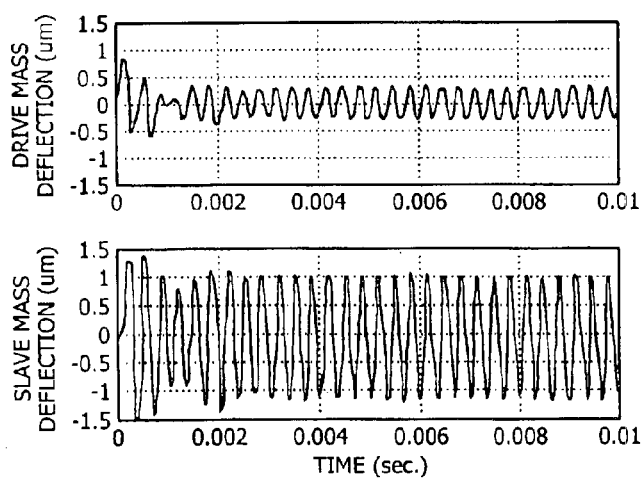
FIG. 4c

US 6,928,874 B2

DYNAMICALLY AMPLIFIED MICROMACHINED VIBRATORY ANGLE MEASURING GYROSCOPES, MICROMACHINED INERTIAL SENSORS AND METHOD OF OPERATION FOR THE SAME

RELATED APPLICATIONS

The present application is related to U.S. Provisional Patent Application Ser. No. 60/426,772, filed on Nov. 15, 2002, which is incorporated herein by reference and to which priority is claimed pursuant to 35 USC 119.

BACKGROUND OF THE INVENTION

1. Field of the Invention

The invention relates to micromachined gyroscopes and in particular to two-mass angle measuring gyroscopes.

2. Description of the Prior Art

All non-micromachined angle measuring gyroscopes are expensive due to the necessity of precision machining to produce each individual device. Previous micromachined implementations of angle measuring gyroscopes used either a single shell or single proof mass as a drive and sense element. These implementations require nonlinear electrostatic actuation, which greatly complicate control, sense, and error suppression.

All micromachined rate gyroscopes are also vibratory in nature, measuring angular rates by detecting energy coupled between orthogonal vibration modes due to Coriolis force. A structural mass is forced into oscillation in one principle structural mode, designated the "drive" mode. The presence of a rotation induced Coriolis force couples the sustained oscillation into an orthogonal structural mode, designated the "sense" mode. The magnitude of vibration induced in the sense mode is proportional to the rotation rate of the device. An example is shown in U.S. Pat. No. 6,481,285, incorporated herein by reference.

As an illustration, consider a structural mass attached to a frame free to move in inertial space (i,j) as schematically shown in FIG. 1. In the coordinate frame of the moving device (X,Y), the equations of motion, assuming the operating frequency is much greater than the rotation rate $$\left(\Omega^2 \ll \frac{k_x}{m}, \frac{k_y}{m}\right),$$

are $$m\ddot{x} + k_x x - 2m\Omega\dot{y} = F_d(t) \quad (1)$$

$$m\ddot{y} + k_y y + 2m\Omega\dot{x} = 0 \quad (2)$$

where m is the lumped mass of the system, kx and ky are the x and y stiffness values, respectively, and $\Omega$ is an input angular rate. To achieve highest sensitivity, the stiffnesses between x and y are typically designed to be the same (kx=ky=k) and in this case, the system is driven at its resonant frequency using a harmonic excitation force Fd (Fd=F0 sin $\omega$t, and $\omega=\sqrt{(k/m)}$). The measured sense acceleration ac is proportional to the input angular velocity $$a_c \sim \Omega \cdot X_0 \omega_n \cos \omega t \quad (3)$$

where X0 is the magnitude of vibration in the x direction. However, no micromachined rate gyroscope has been successful as a long term navigation grade sensor due to amplification of errors that arise from the necessity of integrating the angular rate signal to obtain attitude.

BRIEF SUMMARY OF THE INVENTION

The invention is a micromachined angle measuring gyroscope using a dual mass architecture. Angle measuring gyroscopes, in general, can be used in long term navigation scenarios, as they can avoid integrating drift errors characteristic of rate gyroscopes. By using two coupled masses, one mass can be driven with small amplitudes of motion, ideal for linear control algorithms, while the second mass is amplified at much higher amplitudes of motion, ideal for performance of the sensor.

In contrast to the prior art single mass angle measuring gyroscope, a dual mass architecture or dual mass angle measuring gyroscope is able to decouple the drive and sense elements from each other. The drive element can be driven with small amplitudes, allowing designers to use linear control methodologies, while the slave element is dynamically amplified to higher amplitudes of motion, allowing for higher performance of the device.

Such a device can be implemented in applications requiring long term navigation sensing. An example of applications include virtual reality systems, micro satellite navigation, micro vehicle guidance systems, directional drilling systems, and stabilization systems. In each case, the device would provide high accuracy attitude sensing.

More particularly the invention is defined in one embodiment as an angle measuring gyroscope comprising a substrate having a first surface, a first movable drive mass coupled to the substrate through a first suspension which restricts the range of motion of the drive mass to maintain movement of the drive mass within a linear regime, a second movable slave mass coupled to the drive mass through a second suspension which allows amplification of movement of the slave mass with respect to the drive mass, drive electrodes coupled to the drive mass and defined in a plane above the substrate; sense electrodes coupled to the slave mass and defined in the same plane as the drive electrodes.

The angle measuring gyroscope further comprises a control means for maintaining oscillation of the slave mass without interfere with the measured precession pattern of the slave mass, the control means being coupled to the sense and drive electrodes.

The control means drives the slave mass at a constant amplitude at the first resonant frequency of the gyroscope. The first resonant frequency of the gyroscope corresponds to the first slave mass deflection peak and is approximated as the first system eigenfrequency $\omega_1$. The drive mass and slave mass are substantially decoupled from each other.

In one embodiment the drive mass is an outer drive mass and the slave mass is an inner slave mass as defined by the layout geometry of the gyroscope.

In another embodiment the drive mass is an inner drive mass and the slave mass is an outer slave mass as defined by the layout geometry of the gyroscope.

The drive mass is fabricated to lie in a plane and has at least one window defined therein, and where the drive electrodes are disposed in the at least one window and in the plane of the drive mass.

Similarly, the slave mass is fabricated to lie in a plane and has at least one window defined therein, and where the sense electrodes are disposed in the at least one window and in the plane of the slave mass.

The sense and drive electrodes each have a gap spacing between adjacent electrodes, and where the gap spacing for the sensing electrodes is greater than the gap spacing for the drive electrodes.

The control means generates an output position and velocity signal of the slave mass and feeds back the output position and velocity signal to generate a control signal applied to the drive electrodes and hence to the drive mass to maintain motion of the slave mass at a constant energy state. The control means maintains motion of the slave mass at a constant energy state by injecting additional energy into the drive mass at a first resonant frequency of the gyroscope, resulting in a dynamically amplified slave mass. The control means feeds back the output position and velocity signal to generate a control signal applied to the drive electrodes without interfering with a Coriolis induced precession pattern of the slave mass.

The invention is also a method by which the angle measuring gyroscope described above operates.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 2a diagrammatically illustrates in cross-sectional view a shell gyroscopes in which the device is excited into a cos nθ (n=2 in this case) vibrational pattern.

FIG. 2b is the diagram of FIG. 2a after a device rotation of 90 degrees, the oscillation pattern has precessed from the rotational axes of the device by an angle β. This angle is different depending on the geometry of the device (β=27. for a hemispherical shell gyroscope).

FIG. 2c is a diagram of the frame of reference in a dynamic system for an angle measuring gyroscope is almost identical to that of an angular rate measuring gyroscope. The difference is that oscillation cannot be sustained along one axis in an angle measuring gyroscope, as this would interfere with the precession of the line of oscillation.

FIG. 2d is a diagram of the trajectory of the vibrating mass in terms of the orbital elements. Here the change in the orientation angle φ in the inertial frame (i,j) is equal to the negative of any input angular rate. Thus, if the orbit was initially aligned with the X axis, the instantaneous orientation angle in the moving frame would be equal to the angular deflection.

FIG. 4a is a diagram of a simple model of a coupled dual mass-spring dynamical system. Here $m_1$ is the drive mass and $m_2$ is the slave mass.

FIG. 4b is a graph of the frequency response the dual mass-spring system of FIG. 4a. By actuating the drive mass at the first resonant or antiresonant frequencies, we can achieve large amplitude deflections in the slave mass while retaining small deflections in the drive mass.

FIG. 4c is a graph of the drive mass and slave mass deflections at the first resonant frequency. The slave is amplified to amplitudes much higher than the drive mass.

FIG. 5b is an enlarged view of a portion of FIG. 5a included in the upper right quadrant inset of FIG. 5a.

FIG. 7b is an enlarged view of a portion of the layout of FIG. 7a in the upper right quadrant of FIG. 7a.

FIG. 7c is an enlarged view of a portion of the layout of FIG. 7a in the center of FIG. 7a.

Figure 1:
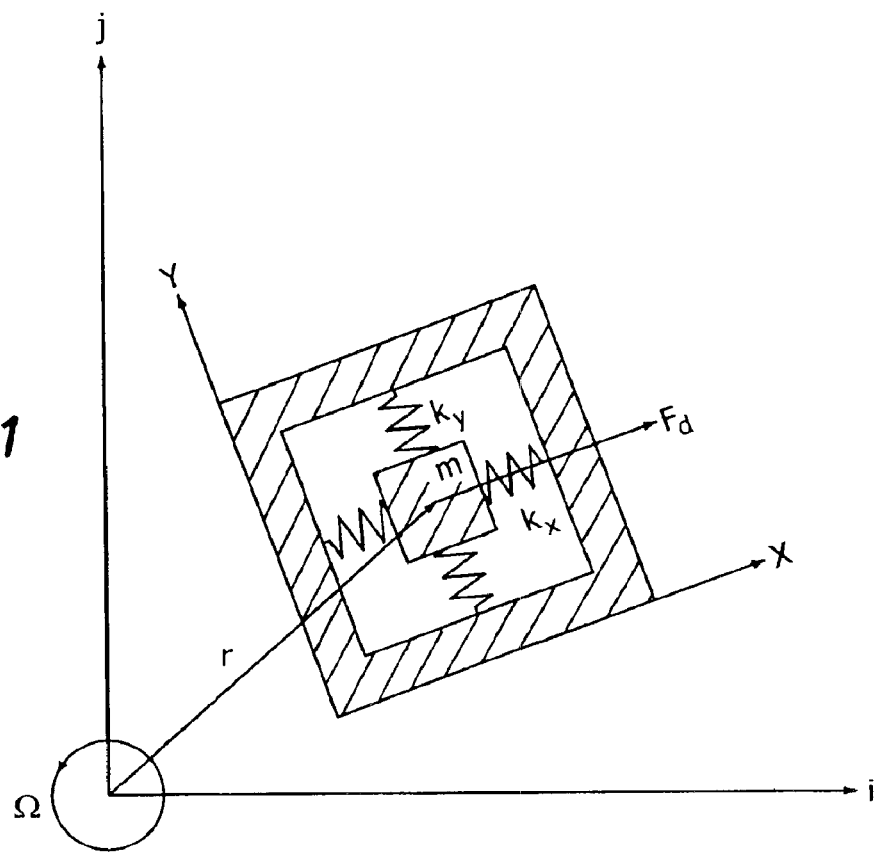
FIG. 1 is a diagram illustrating the relationship between various frames of reference in a dynamic system of a micromachined vibratory rate gyroscope.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

A micromachined angle measuring gyroscope using a dual mass architecture measures angular positions rather than angular rates. Current single mass angle measuring gyroscopes suffer from the problem of nonlinearities due to parallel plate actuation necessary for the successful operation of the device. In these devices, it is impossible to simultaneously achieve high performance through high amplitude motion and also operate in a linear operating regime characteristic of small amplitude motion. The invention decouples the effects of drive and sense through the use of a dual mass architecture. The device is comprised of a single lumped (referred to herein as the drive mass) mass structurally coupled to a second (referred to herein as the slave mass) lumped mass, where the drive mass is electrostatically driven at the first resonant frequency the system using parallel plate electrodes. As a result of the coupling, the slave mass is driven to much higher amplitudes compared to the drive mass, i.e. the motion is dynamically amplified. Since the deflections of the drive mass are small, the device is less sensitive to nonlinearities in the drive actuation and thus, linear dynamical assumptions can be utilized. In the presence of rotation, the line of oscillation in both masses precesses, which is easily detectable in the slave mass due to the amplified motion. The sensed precession pattern is exactly equal to the angle of rotation. The two presented devices are z-axis realizations of this principle, where the first device uses an inner drive/outer sense architecture and the second uses an outer drive/inner sense architecture. Each prototype has been fabricated using JDS Uniphase's MUMPS technology.

A preliminary literature search shows that there does not exist an inertial sensor that satisfies all the novel conditions of the invention, namely: (1) micromachined, (2) dual mass, and (3) angle measuring. The method of improving performance is through the implementation of angle measuring gyroscopes, which mechanically integrate the input rotation and output an angular position.

Angle Measuring Gyroscopes

In rate gyroscopes, it is necessary to integrate the signal in order to obtain the position. However, the long term drift and angle random walk errors are also integrated, resulting in significant displacement errors over hours or even minutes of operation. In contrast to vibratory rate gyroscopes, angle measuring gyroscopes output a signal proportional to angular displacement of the device. While drift and walk errors will still be prevalent in the angle measuring gyroscope, they avoid magnification of errors through integration, making them more suitable for inertial grade applications. In general, vibratory angle measuring gyroscopes can be classified into vibrating shells and vibratory masses.

Vibratory Shells

The idea of vibrating shells as angular sensors is a relatively new idea based on an old principle of inertial properties of standing elastic waves. A wine glass when struck will give a pure and continuous tone as diagrammatically depicted in FIG. 2a, which illustrates an exaggerated shape of excitation of a shell. In 1890, G. H. Bryan made the observation that an observer rotating around very quickly while holding the wine glass will hear beats. Thus, the nodal meridians of the standing wave on the wine glass do not rotate with the same angular velocity as the glass and observer. The precession of the standing wave with respect to the observer can then be used to derive angular position and velocity. Here, the precession of the oscillation pattern is proportional to the angle of rotation of the device as diagrammatically depicted in FIG. 2b. The constant of proportionality varies according to the geometry of the device. While vibrating hemispherical shells have achieved incredible performance, existing rate integrating gyroscope technologies are either costly to manufacture or are restricted to sense electrodes being located around the periphery of the device, limiting the performance.

Vibratory Single Mass

Consider a mass-spring system with a moving X-Y coordinate system with respect to an i-j fixed world frame as diagrammatically depicted in FIG. 2c. Under ideal implementation of the gyroscope, the rotation is constant ($\dot{\Omega}=0$), the stiffness values are equal and are much larger than the mass times the rotation squared ($k=k_x=k_y$, $k \gg m\Omega^2$), and damping is compensated for ($c_x$, $c_y \sim 0$). With these simplifications and dividing by mass, the equations of motion become $$\ddot{x} + \omega_n^2 x - 2\Omega \dot{y} = 0$$
$$\ddot{y} + \omega_n^2 y + 2\Omega \dot{x} = 0 \quad (4)$$

where $\omega_n = \sqrt{k/m}$ is the natural frequency. In a non-rotating system ($\Omega=0$), the solution is an ellipse of semi-major axis length a, semi-minor axis length b, and oriented at an angle $\phi$ from the X-Y axes as diagrammatically depicted in FIG. 2d. A convenient way of expressing the dynamics of the system is using these elliptical "orbital" variables which is well understood in the art as proposed by Friedland and Hutton, "*Theory And Error Analysis Of Vibrating-Member Gyroscope,*" IEEE Transactions on Automatic Control, AC-23(4):545–556, 1978. When the ellipse is oriented with the X-Y axes, the solution can be expressed by $$x = a \cos(\omega_n t + \gamma_0) \quad (5)$$
$$y = b \sin(\omega_n t + \gamma_0) \quad (6)$$

where $y_0$ defines the initial "orbital angle" $\gamma$ which designates the starting point of the mass on the ellipse. To account for the orientation of the ellipse, we use a coordinate transform by a rotation $\phi$. The complete generalized elliptical equations are then $$x = a \cos\phi \cos(\omega_n t + \gamma_0) - b \sin\phi \sin(\omega_n t + \gamma_0) \qquad (7)$$

$$y = a \sin\phi \cos(\omega_n t + \gamma_0) + b \cos\phi \sin(\omega_n t + \gamma_0) \qquad (8)$$

Based off the position and velocity, the orientation angle can be instantly calculated by $$\tan 2\phi = \frac{2(\omega_n^2 xy + \dot{x}\dot{y})}{\omega_n^2 (x^2 - y^2) + (\dot{x}^2 - \dot{y}^2)} \qquad (9)$$

where $\phi$ is equal to the negative angle of rotation $$\phi = \int_0^\tau \Omega \, dt \qquad (10)$$

Figure 3A:
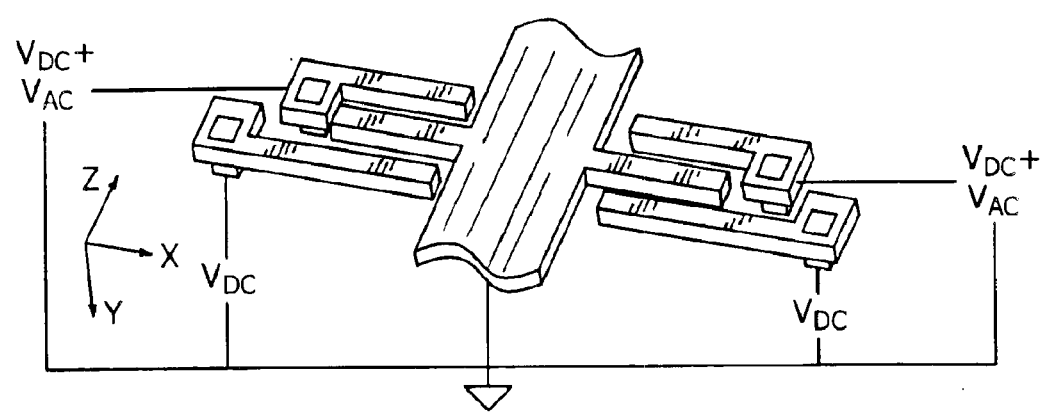
FIG. 3a is a perspective diagram of a device using parallel plate actuation, necessary for successful implementation of micromachined angle measuring gyroscopes, which offers the advantage of large forces at low power at the price of limited linearity.
Figure 3B:
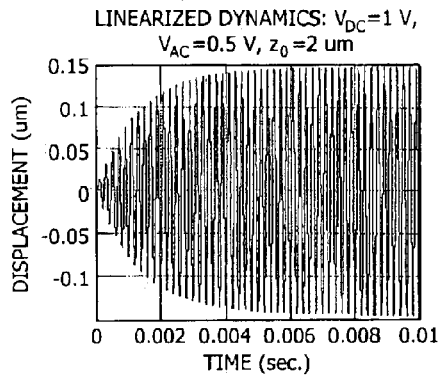
FIG. 3b is a graph of displacement as a function of time which illustrates the dynamic response assuming linearized equations of motion under the assumption of small deflections.
Figure 3C:
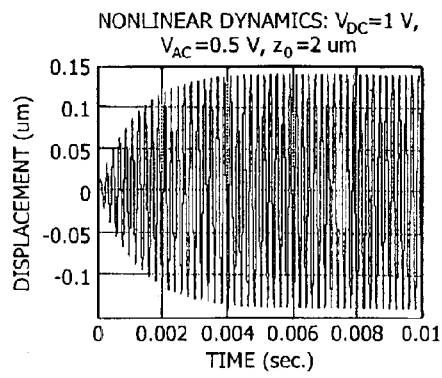
FIG. 3c is a graph of displacement as a function of time which illustrates nonlinear equations of motion. The dynamic response of FIGS. 3b and 3c are identical. Thus, linear control laws can be implemented.
Figure 3D:
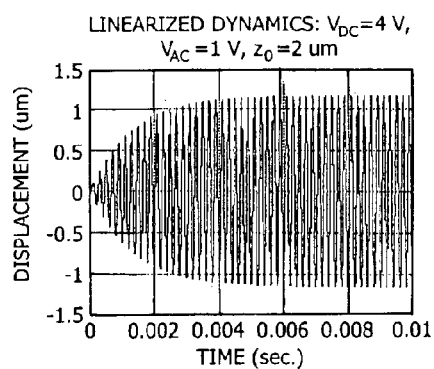
FIG. 3d is a graph of displacement in the linear case as a function of time which illustrates the dynamic response when deflections are larger.
Figure 3E:
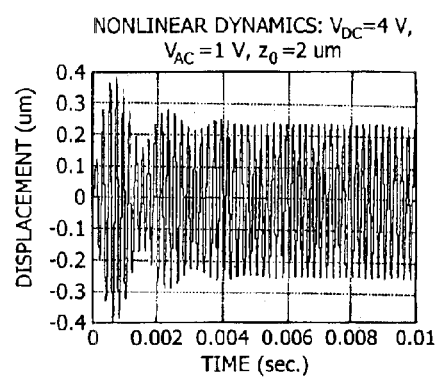
FIG. 3e is a graph of displacement in the nonlinear case as a function of time which illustrates the dynamic response when deflections are larger. There is substantial difference between the linear and nonlinear cases. Here, a linear control would not be appropriate.

An existing "lumped" mass-spring rate integrating gyroscope working on these principles has been proposed which offers the advantage of reduced cost through batch fabrication and increased sense capabilities through the integration of sense electrodes throughout the moving structure. However, this gyroscope requires the use of electrostatic parallel plates for drive and sense to assure proper implementation of its two dimensional control architecture as illustrated in the perspective view of FIG. 3a. The force as a function of applied voltage along one dimension is $$F_z = \frac{\epsilon_0 A}{2}\left[\left(\frac{1}{z_0 - z}\right)^2 (V_{DC} + V_{AG})^2 - \left(\frac{1}{z_0 + z}\right)^2 (V_{DC})^2 \right] \qquad (11)$$

where A is the overlapping area of the electrodes, $\epsilon_0$ is the permittivity of a vacuum, $z_0$ is the initial gap, and z is the varying deflection of the device. From equation (11), we see that this type of electrostatic actuation is inherently nonlinear, varying as the inverse quadratic of position. This offers the advantage of increased actuation force using low power, but introduces a new level of complexity in formulating control algorithms. Designers of micromachined inertial sensors that implement parallel plate electrodes circumvent this challenge by limiting the device to small deflections either by design or through force to rebalance feedback systems. Under small deflection assumptions, equation (11) can be linearized such that linear control laws can be implemented as graphically depicted in the graphs of FIGS. 3b and 3c. However, micromachined angle measuring gyroscopes require high amplitude free oscillation in order to achieve the best performance. As a result, a single mass rate integrating gyroscope cannot simultaneously achieve highest performance while utilizing linear control laws as illustrated in the graphs of FIGS. 3d and 3e.

The Innovation of the Proposed Invention

The solution of the invention to this challenge is a dual mass system where one mass is used exclusively for drive and control and the second mass is used exclusively for sensing motion. With an appropriate choice of geometry, the first mass (referred to herein as the drive mass) will have a restricted range of motion so as to maintain a linear regime. The drive mass will be coupled to a second mass (referred to herein as the slave mass) whose motion will be amplified with respect to the drive mass, so as to achieve high levels of amplitude to facilitate higher performance of the device. While existing innovative work under these principles has been done consisting of micromachined dual mass rate gyroscopes, the device of the invention is an angle measuring gyroscope which measures the full angle.

A more general dual mass resonator device using parallel plate electrodes was presented in W. Clark, et.al., "Dual-Mass Vibratory Rate Gyroscope With Suppressed Translational Acceleration Response And Quadrature-Error Correction Capability," U.S. Pat. No. 6,230,563 (2001), which is incorporated herein by reference. However this device cannot be used as an angle measuring gyroscope as the drive and sense operate only along single axes. In our design, to facilitate angle measuring capabilities, drive and sense electrodes are placed such to enable driving and sensing along two orthogonal axes in the same plane. Additionally, the device utilizes a novel control architecture which maintains the oscillation of the slave mass and does not interfere with the measured precession pattern.

In summary, the invention presents the following new and innovative technologies:

A micromachined angle measuring gyroscope using a dual mass structural architecture which decouples drive and sense capabilities.

The device uses a novel control architecture which drives the slave mass at a constant amplitude at the first resonant frequency of the system.

Additionally, this control does not interfere with the measured precession of the oscillation pattern.

Principles of Operation

System Dynamics

For a dual mass-spring-damper model such as diagrammatically depicted in FIG. 4a, the equations of motion along the initial line of oscillation are $$m_1 \ddot{x}_1 + c_1 \dot{x}_1 + (k_1 + k_2)x_1 - k_2 x_2 = F \qquad (12)$$

$$m_2 \ddot{x}_2 + c_2 \dot{x}_2 + k_2 x_2 - k_2 x_1 = 0 \qquad (13)$$

Here, any coupled damping between the masses can be neglected if there is good separation between the drive and slave mass, as is the case in our design. If F is a sinusoidal force with frequency $\omega$ and amplitude $F_0$, then the decoupled transfer functions for the two masses are $$\frac{X_1}{F_0} = \frac{(\omega_2^2 - \omega^2) + \frac{c_2}{m_2}\omega j}{m_1 \left[\begin{array}{c}\left(\omega_1^2 + \frac{c_1}{m_1}\omega j - \omega^2\right)\left(\omega_2^2 + \frac{c_2}{m_2}\omega j - \omega^2\right) + \\ \omega \omega_2^2 \frac{c_2}{m_1} - \frac{k_2}{m_1}\omega^2 \end{array}\right]} \qquad (14)$$

$$\frac{X_2}{F_0} = \frac{\omega_2^2}{m_1 \left[\begin{array}{c}\left(\omega_1^2 + \frac{c_1}{m_1}\omega j - \omega^2\right)\left(\omega_2^2 + \frac{c_2}{m_2}\omega j - \omega^2\right) + \\ \omega \omega_2^2 \frac{c_2}{m_1} - \frac{k_2}{m_1}\omega^2 \end{array}\right]} \qquad (15)$$

where $\omega_1 = \sqrt{(k_1/m_1)}$ and $\omega_2 = \sqrt{(k_2/m_2)}$. The drive frequencies of interest are the first resonant frequency and the antiresonant frequency as graphically depicted in FIG. 4b. The first resonant frequency of the device corresponds to the first slave mass deflection peak. This frequency is approximated as the first system eigenfrequency $\omega_1$, where the two eigenfrequencies $\omega_1$ and $\omega_2$ are $$\tilde{\omega}_1^2, \tilde{\omega}_2^2 = \frac{1}{2}\left[\omega_1^2 + \omega_2^2 + \frac{k_2}{m_1} \mp \sqrt{\left(\omega_1^2 - \omega_2^2 + \frac{k_2}{m_1}\right)^2 + 4\frac{k_2}{m_1}\omega_2^2}\right] \quad (16)$$

The antiresonant frequency corresponds to the minimum deflection of the drive mass and can be derived by solving for w where the numerator of the gain of the drive mass is at a minimum, or the first derivative is zero. This antiresonant frequency is $$\omega_{ar} = \sqrt{\omega_2^2 - \frac{c_1^2}{2m_1^2}} \quad (17)$$

which, we note, corresponds to the damped resonant frequency of the isolated second mass-spring-damper system. The trade off between operating at the antiresonance or the first eigenfrequency is that better dynamic amplification is achieved at antiresonance, but higher deflections are achieved at the eigenfrequency for the same actuation force as graphically illustrated in FIG. 4c. While antiresonance is commonly used in rate gyroscopes, the need for a control which would not interfere with the precession pattern motivated using the first resonant frequency.

Micromachined Implementation

The conceptual design disclosed above can be fabricated using a variety of different technologies ranging from surface micromachining to bulk micromachining to LIGA. Currently, prototypes using Multi-User Microelectromechanical Systems Processes (MUMPS) described by K. W. Markus, et al., in "MEMS Infrastructure: The Multi-User MEMS Processes (MUMPs)", Proc. SPIE, Vol. 2639 (Micromachining and Microfabrication Process Technology, Austin, Tex., USA, 23–24, Oct. 5, 1995), p. 54–63. MUMPS surface micromachining process as developed by JDS Uniphase Corp. of San Jose, Calif., have been fabricated.

Inner Drive/Outer Slave

Figure 5A:
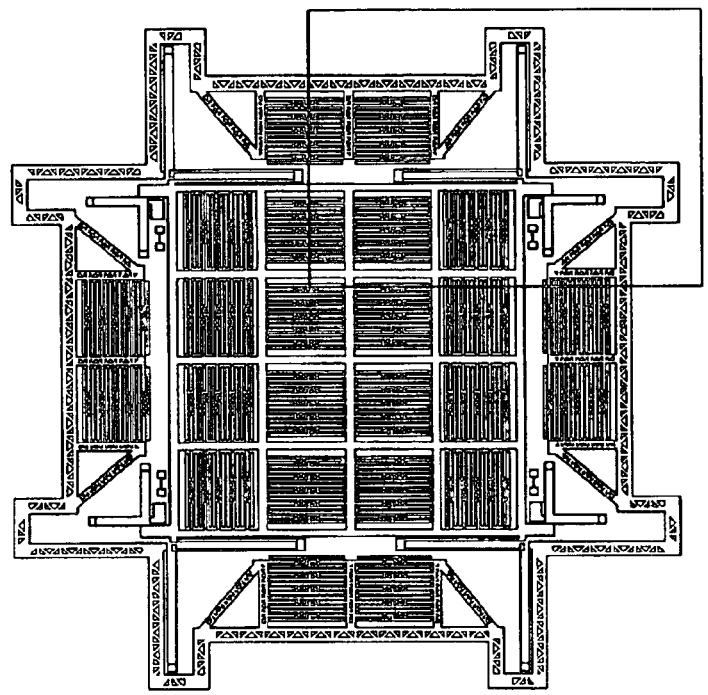
FIG. 5a is a layout diagram of a first embodiment which comprises an inner drive mass $m_1$ connected to an inner suspension $k_1$, which is rigidly attached to the substrate by anchors. The inner mass is in turn coupled to an outer slave mass $m_2$ via a coupled suspension $k_2$.
Figure 5B:
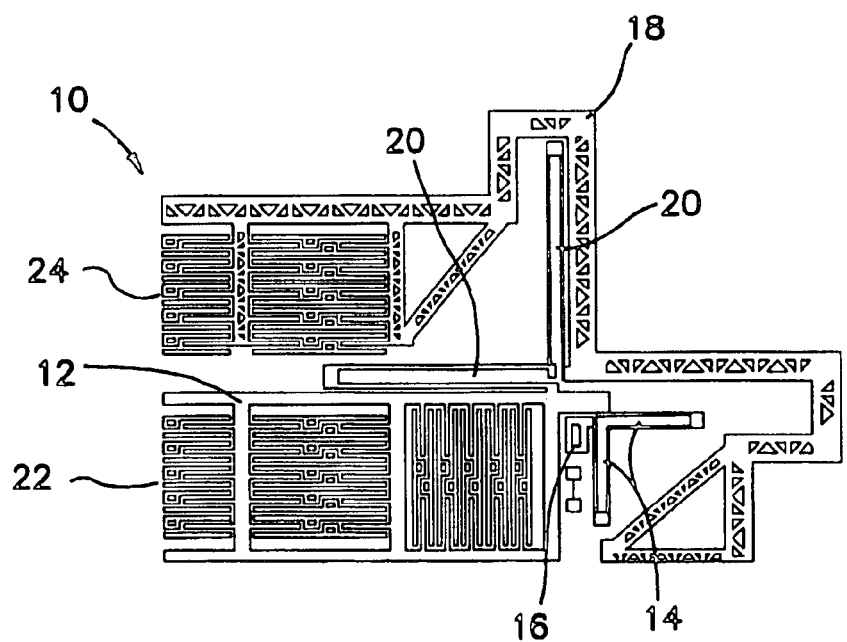
Figure 6A:
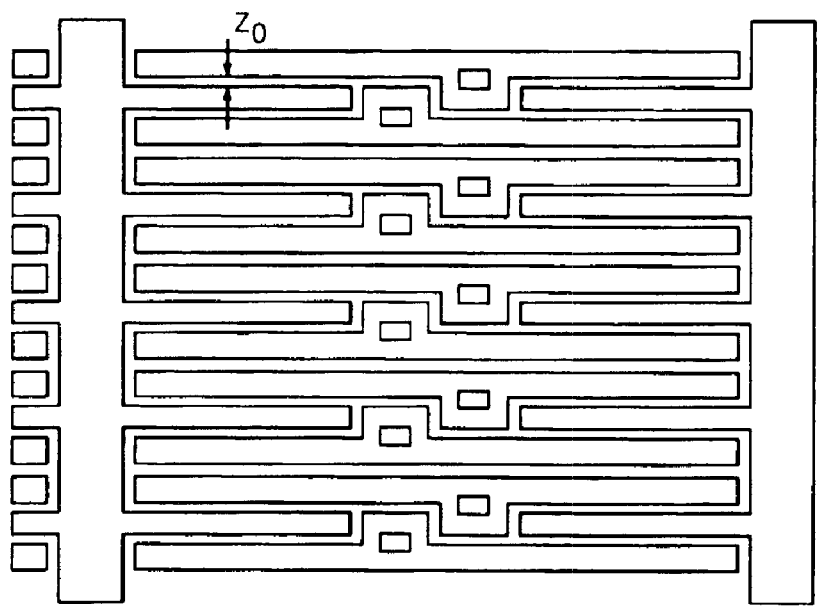
FIG. 6a is a simplified layout diagram in enlarged scale showing a portion of the actuation means supplied via parallel plate electrodes interwoven in windows throughout the drive mass.
Figure 6B:
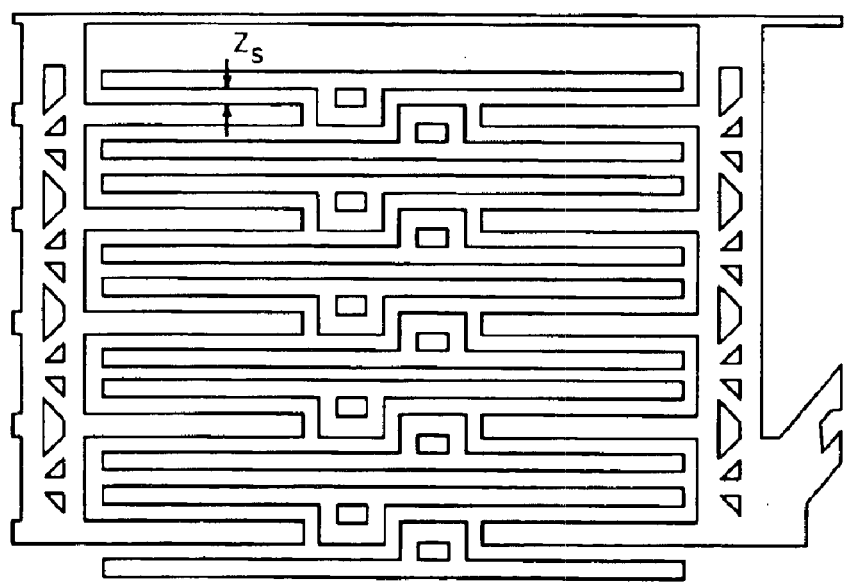
FIG. 6b is a simplified layout diagram in enlarged scale showing a portion of the sensing means using a change in capacitance of parallel plate electrodes interwoven in windows throughout the slave mass. The sense gap $z_s$ is designed to be larger than the drive gap $z_0$ to allow for dynamic amplification.

Based on the aforementioned principles of operation, we present two different designs or embodiments of a z-axis realization of the angle measuring gyroscope 10. The first embodiment is illustrated in the plan view layout diagram of FIG. 5a and in particular in the inset in expanded scale shown in FIG. 5b. The first embodiment comprises an inner drive mass 12, $m_1$, which is connected to four inner suspension members 14 which together form the first stiffness $k_1$ of the gyroscope 10. The suspension members 14 are each fixed to the substrate (not shown) which is assumed to be positioned below the device 10 via anchors 16. The drive mass 12 is connected to a second outer slave mass 18, $m_2$, by four coupled suspension members 20 which together comprise the outer stiffness $k_2$ of the device 10. Interwoven in windows throughout the drive mass 12 are fixed parallel plate electrodes 22 with gap spacing of $z_0$ used for actuating the device 10 as best shown in the diagrammatic, enlarged view of FIG. 6a. Similarly, windows located throughout the slave mass 18 contain parallel plate electrodes 24 with a gap spacing of $z_s$ used for sensing deflections of the slave mass 18. Here $z_s > z_0$ to allow for larger deflections of the slave mass 18. A voltage consisting of a DC signal plus an AC signal operating at the antiresonant frequency is applied to the fixed drive electrodes 22. A fixed DC signal is applied to the sense electrodes 24 to sense the deflection.

Outer Drive/Inner Slave

Figure 7A:
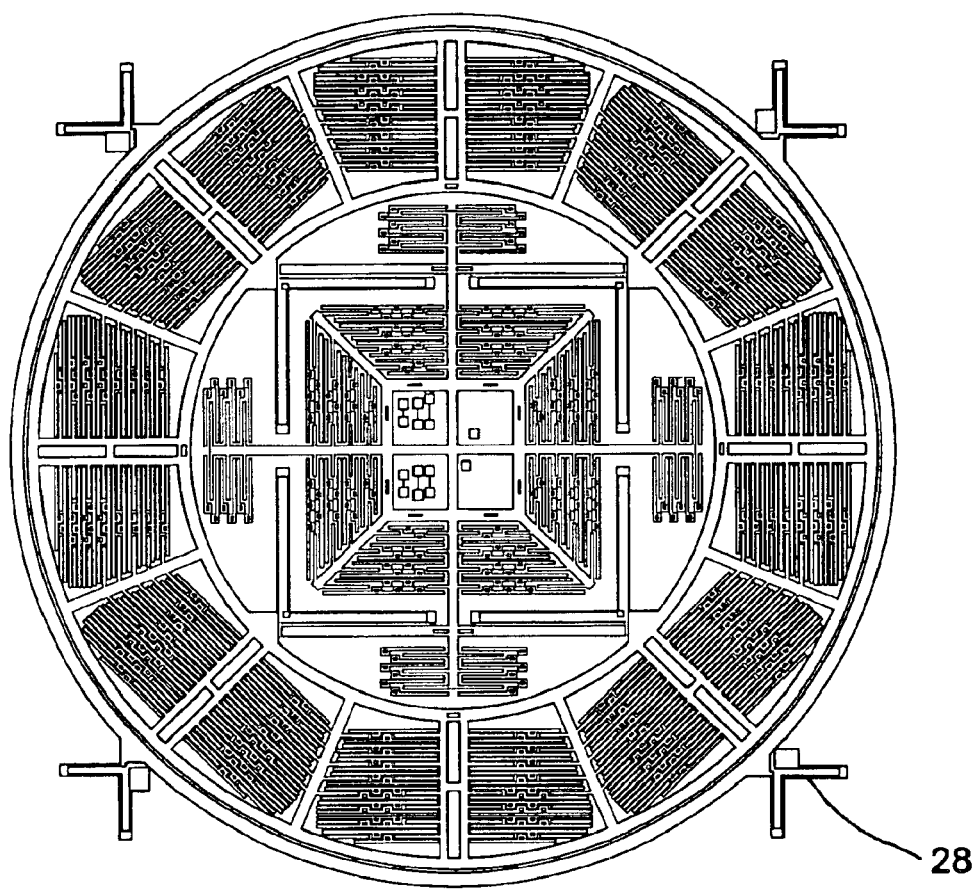
FIG. 7a is a simplified layout diagram of a second embodiment which is comprised of an outer drive mass $m_1$ connected to an outer suspension $k_1$, which is rigidly attached to the substrate by anchors. The outer mass is in turn coupled to an inner slave mass $m_2$ via a coupled suspension $k_2$.
Figure 7B:
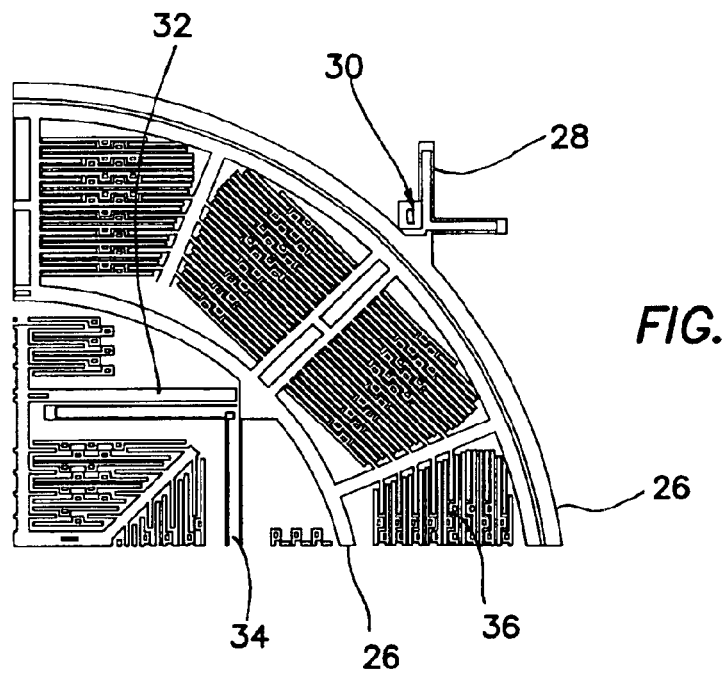
Figure 7C:
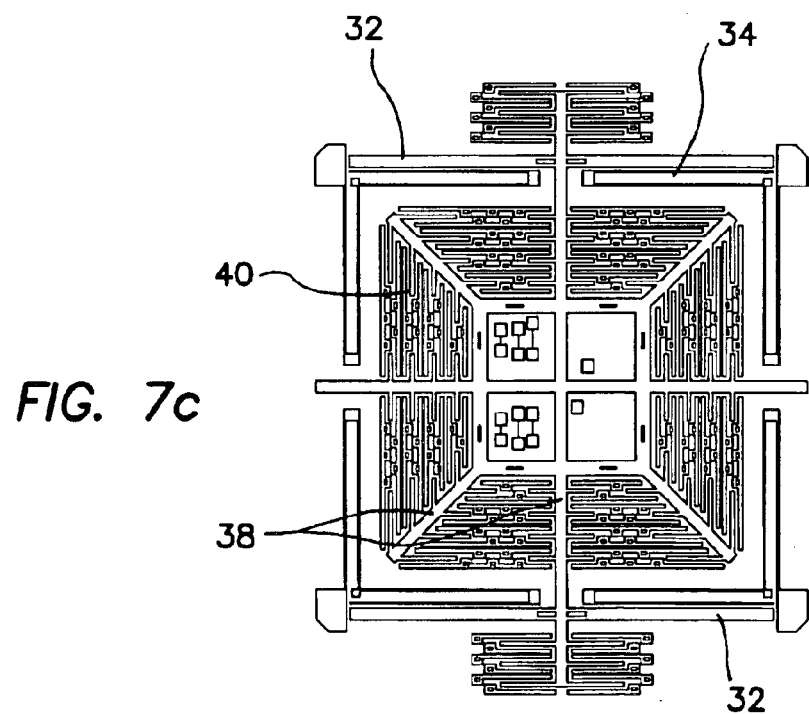
Figure 8A:
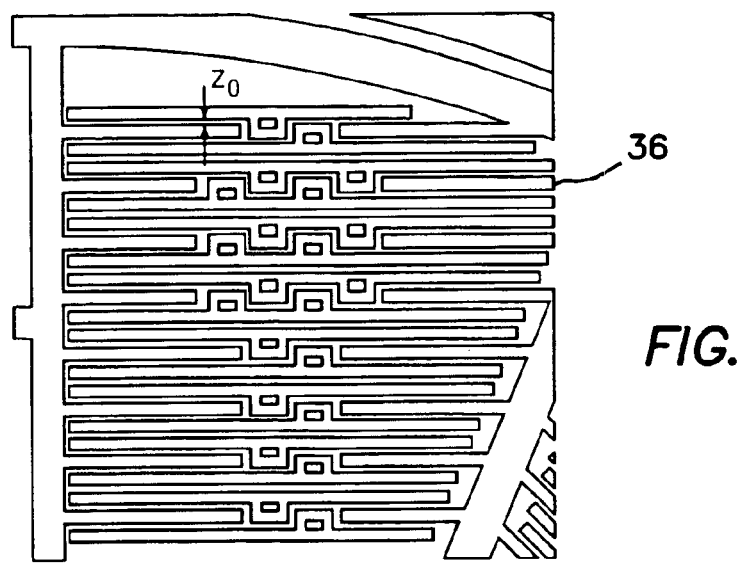
FIG. 8a is an enlarged view of a portion of the layout of 7a illustrating how actuation is supplied via parallel plate electrodes interwoven in windows throughout the drive mass.
Figure 8B:
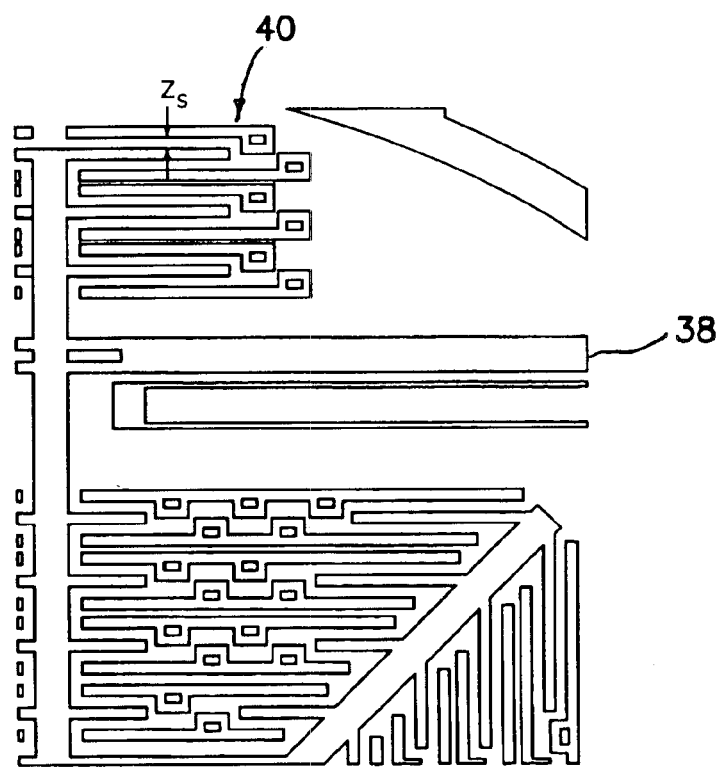
FIG. 8b is an enlarged view of a portion of the layout of 7a illustrating how the sensing is accomplished through change in capacitance of parallel plate electrodes interwoven in windows throughout the slave mass. The sense gap $z_s$ is designed to be larger than the drive gap $z_0$ to allow for dynamic amplification.

The second embodiment or device 10 shown in the overall view of FIG. 7a and the inner portion of which is shown in FIG. 7c and an outer quadrant of which is shown in FIG. 7b comprises an outer drive mass 26, $m_1$, which is connected to four outer suspension members 28, which together form the first stiffness $k_1$ of the device. The suspension members 28 are each fixed to the substrate (not shown) which is below the device 10 via anchors 30. The drive mass 26 is connected to a second outer slave mass 32, $m_2$, by four coupled suspension members 34 which together comprise the inner stiffness $k_2$ of the device 10. Interwoven in windows throughout the drive mass 26 are fixed parallel plate electrodes 36 with gap spacing of $z_0$ used for actuating the device 10 as better shown in FIG. 8a. Similarly, windows located throughout the inner slave mass 38 contain parallel plate electrodes 40 with a gap spacing of $z_s$ used for sensing deflections of the slave mass 38. Here $z_s > z_0$ to allow for larger deflections of the slave mass 38. A voltage consisting of a DC signal plus an AC signal operating at the first eigenfrequency are applied to the fixed drive electrodes 36. A fixed DC signal is applied to the sense electrodes 40 to sense the deflection.

X/Y Angle Measuring Gyroscope Realization

The aforementioned prototypes are realizations of an angle measuring gyroscope which measures angular displacement about an axis perpendicular to the substrate (Z-axis). Without a loss of generality, the principles of operation may also be realized in gyroscopes which measure angular displacements about either axis parallel to the substrate (X or Y axis). In this embodiment of the device, one set of drive and sense electrodes would be planar to the substrate, while the second set of drive and sense electrodes would be oriented perpendicular to the substrate. However, like the z-axis angle measuring gyroscope, the masses would vibrate within the same plane as the electrodes.

Control System

Figure 9:
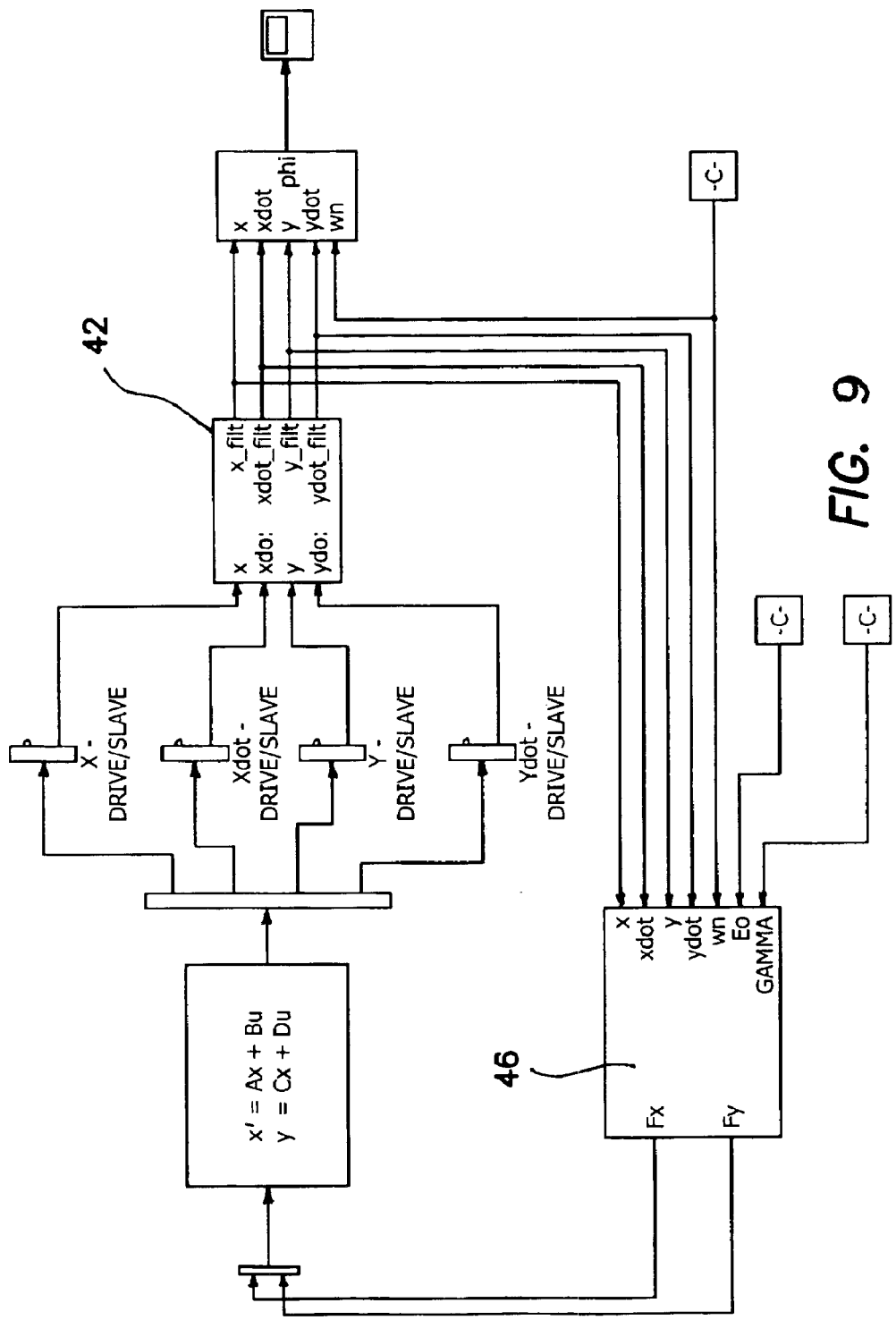
FIG. 9 is a schematic diagram of a control system, where it is assumed that sense only based on the slave mass deflection can be performed while applying forces only on the drive mass. The slave mass deflection and velocity are read and passed through a low pass filter (State Low Pass Filter) to remove signal components at the second eigenfrequency and eliminate any high frequency noise and this signal is used to calculate the current precession angle (CalculateAngle). Elimination of the second eigenfrequency component of the output is necessary to correctly calculate the value of the precession angle and avoid interfering with the precession. The filtered signal is fed back into an energy compensating controller (Energy Compensating Drive Control) which drives the slave mass at the first resonance peak and additionally does not interfere with the natural precession pattern.
Figure 10A:
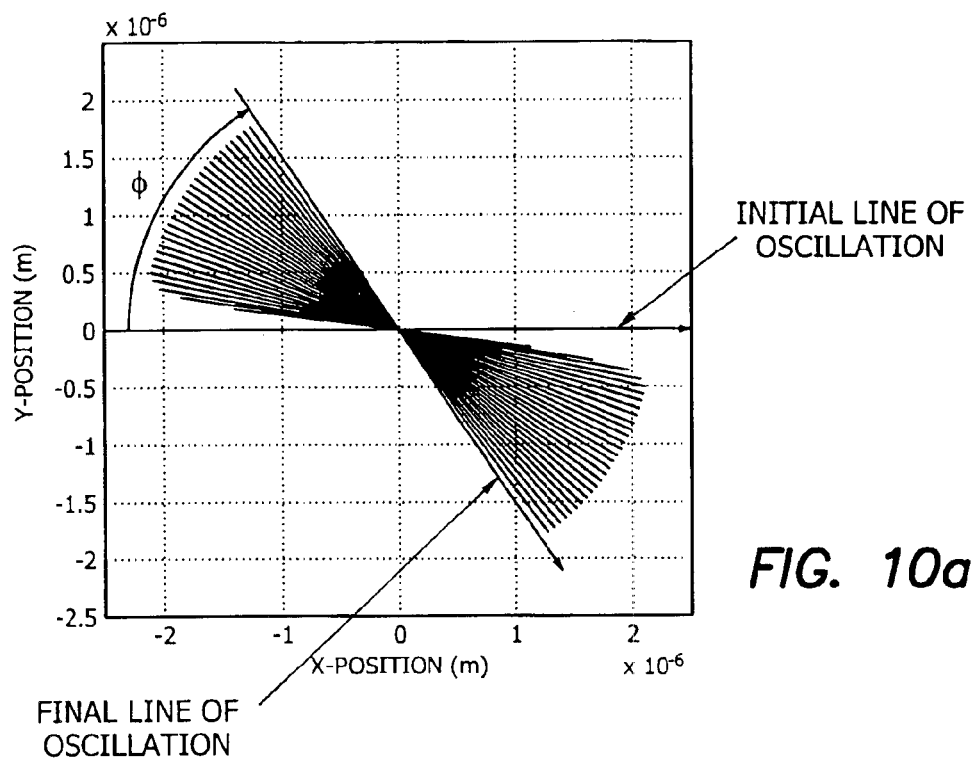
FIG. 10a is a graph of the X and Y position of the sense mass showing the dynamic response of the device under the energy compensating controller of FIG. 9. The line of oscillation is free to precess in the presence of an input Z rotation rate $\Omega$.
Figure 10B:
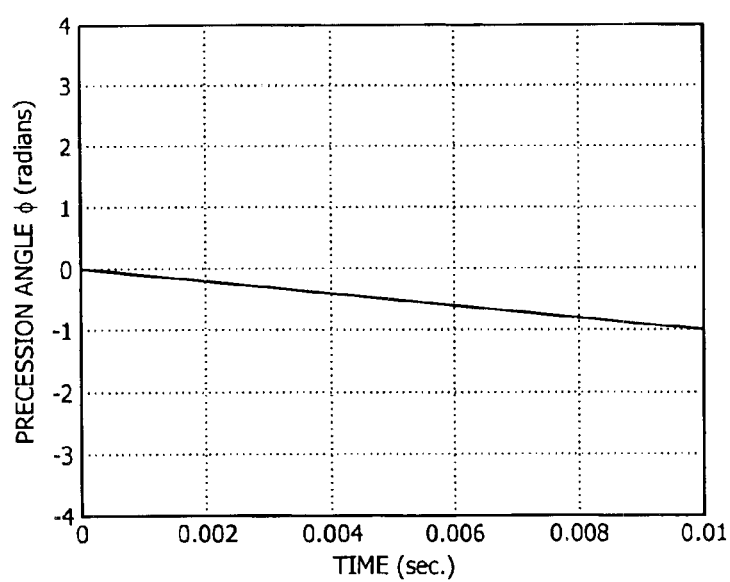
FIG. 10b is a graph showing the precession angle as a function of time. The CalculateAngle box of the controller of FIG. 9 monitors the precession angle, which is identically equal to the negative angle of rotation (i.e. $\phi = -\int \Omega \, dt$).

The control system of the device 10 is schematically shown in block diagram in FIG. 9 and assumes sensing in only the slave mass 18, 40 and driving capabilities in only the drive mass 22, 26. The output slave mass position and velocity is first fed through a filter 42 to remove signal components at the second eigenfrequency and eliminate unwanted high frequency noise. During the normal operation of the device 10, an input z rotation rate will cause precession of the initial straight line of oscillation 44 as graphically illustrated in FIG. 10a. The filtered output position and velocity are used to monitor this precession angle, which can be calculated using equation (9). This angle is equal to the angle of rotation of the device 10. The filtered signal is fed back through an energy compensating controller 46 to maintain motion of the slave mass 18, 40 at a constant energy state. The control has an architecture of the form $$\begin{Bmatrix} F_x \\ F_y \end{Bmatrix} = -\gamma_2 \cdot \Delta E \cdot \begin{Bmatrix} \dot{x}_2 \\ \dot{y}_2 \end{Bmatrix}. \quad (18)$$

where $F_x$ and $F_y$ are forces applied on the drive mass, $y_2$ is a constant gain, and $\dot{x}$ and $\dot{y}$ are the slave mass velocities along the x and y directions. Here $\Delta E$ is the change in slave mass energy given as $$\Delta E = E_0 - \frac{\tilde{\omega}_2^2(x_2^2 + y_2^2) + (\dot{x}_2^2 + \dot{y}_2^2)}{2} \quad (19)$$

where $E_0$ denotes nominal energy of the slave mass normalized with respect to the effective slave mass. This control architecture maintains the oscillation of the slave mass by injecting additional energy at the first resonant frequency of the system to the drive mass, resulting in a dynamically amplified slave mass. Additionally, the control does not interfere with the measured Coriolis induced precession pattern as graphically illustrated in FIG. 10b.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An angle measuring gyroscope which measures angular position arising from angular motion comprising:
    a substrate having a first surface;
    a first movable drive mass coupled to the substrate, movable in two orthogonal directions;
    a second movable slave mass, movable in two orthogonal directions;
    two sets of orthogonal drive electrodes coupled to the drive mass to drive the drive mass in two orthogonal directions and defined in a plane above the substrate;
    two sets of orthogonal sense electrodes coupled to the slave mass to sense movement of the slave mass in two orthogonal directions and defined in the same plane as the drive electrodes; and
    a two-degree of freedom suspension coupling the drive mass to the slave mass, the suspension restricting the range of motion of the drive mass to maintain movement of the drive mass within a linear regime, while allowing amplification of movement of the slave mass with respect to the drive mass.

2. The angle measuring gyroscope of claim 1 further comprising a control means for maintaining oscillation of the slave mass without interfering with the measured precession pattern of the slave mass, the control means being coupled to the sense and drive electrodes.

3. The angle measuring gyroscope of claim 2 where the control means drives the slave mass at a constant amplitude at a first resonant frequency of the gyroscope.

4. The angle measuring gyroscope of claim 3 where the first resonant frequency of the gyroscope corresponds to a first slave mass deflection peak.

5. The angle measuring gyroscope of claim 4 where the first resonant frequency is approximated as the first system eigenfrequency $\omega_1$.

6. The angle measuring gyroscope of claim 1 where the dynamic motion of the drive mass and slave mass are decoupled from each other.

7. The angle measuring gyroscope of claim 2 where the control means generates an output position and velocity signal of the slave mass and feeds back the output position and velocity signal to generate a control signal applied to the drive electrodes and hence to the drive mass to maintain motion of the slave mass at a constant energy state.

8. The angle measuring gyroscope of claim 7 where the control means maintains motion of the slave mass at the constant energy state by injecting additional energy into the drive mass at a first resonant frequency of the gyroscope, resulting in a dynamically amplified slave mass.

9. The angle measuring gyroscope of claim 2 where the control means feeds back the output position and velocity signal to generate a control signal applied to the drive electrodes without interfering with a Coriolis induced precession pattern of the slave mass.

10. The angle measuring gyroscope of claim 1 where the gyroscope has a characterizing geometry defining the manner in which it is laid out on the substrate and where the drive mass is an outer drive mass and the slave mass is an inner slave mass as defined by the geometry of the gyroscope.

11. The angle measuring gyroscope of claim 1 where the gyroscope has a characterizing geometry defining the manner in which it is laid out on the substrate and where the drive mass is an inner drive mass and the slave mass is an outer slave mass as defined by the geometry of the gyroscope.

12. The angle measuring gyroscope of claim 1 where the drive mass is fabricated to lie in a plane and has at least one window defined therein, and where the drive electrodes are disposed in the at least one window and in the plane of the drive mass.

13. The angle measuring gyroscope of claim 12, where the slave mass is fabricated to lie in a plane and has at least one window defined therein, and where the sense electrodes are disposed in the at least one window and in the plane of the slave mass.

14. The angle measuring gyroscope of claim 1 where the slave mass is fabricated to lie in a plane and has at least one window defined therein, and where the sense electrodes are disposed in the at least one window and in the plane of the slave mass.

15. The angle measuring gyroscope of claim 1 where the sense and drive electrodes each have a gap spacing between adjacent electrodes, and where the gap spacing for the sensing electrodes is greater than the gap spacing for the drive electrodes.

16. A method of operating an angle measuring gyroscope which measures angular position arising from angular motion comprising:
driving a first movable drive mass in two orthogonal directions with drive electrodes coupled to the drive mass and defined in a plane;
coupling the motion of the drive mass to a second movable slave mass through a two-degree of freedom suspension coupling between the drive mass and the slave mass, the suspension restricting the range of motion of the drive mass to maintain movement of the drive mass within a linear regime, while allowing amplification of movement of the slave mass in two orthogonal directions with respect to the drive mass; and
sensing motion of the slave mass in two orthogonal directions with sense electrodes coupled to the slave mass and defined in the same plane as the drive electrodes.

17. The method of claim 16 further comprising maintaining oscillation of the slave mass by means of control of the drive electrodes without interfering with the measured precession pattern of the slave mass.

18. The method of claim 17 where maintaining oscillation of the slave mass without interfere with the measured precession pattern of the slave mass comprises driving the slave mass at a constant amplitude at a first resonant frequency of the gyroscope.

19. The method of claim 18 where driving the slave mass at a constant amplitude at a first resonant frequency of the gyroscope comprises driving the slave mass at a first slave mass deflection peak.

20. The method of claim 19 where driving the slave mass at the first slave mass deflection peak comprises driving the slave mass at a first system eigenfrequency $\omega_1$.

21. The method of claim 17 further comprising generating an output position and velocity signal of the slave mass and feeding back the output position and velocity signal to generate a control signal which is applied to the drive electrodes and hence to the drive mass to maintain motion of the slave mass at a constant energy state.

22. The method of claim 21 further comprising maintaining the motion of the slave mass at the constant energy state by injecting additional energy into the drive mass at the first resonant frequency of the gyroscope, resulting in a dynamically amplified slave mass.

23. The method of claim 17 where feeding back the output position and velocity signal generates a control signal applied to the drive electrodes without interfering with a Coriolis induced precession pattern of the slave mass.

24. The method of claim 16 further comprising decoupling the dynamic motion of the drive mass and slave mass from each other.

25. The method of claim 16 where the gyroscope has a characterizing geometry defining the manner in which it is laid out on the substrate and where driving the drive mass comprises driving an outer drive mass and where sensing the slave mass comprises sensing an inner slave mass as defined by the geometry of the gyroscope.

26. The method of claim 16 where the gyroscope has a characterizing geometry defining the manner in which it is laid out on the substrate and where driving the drive mass comprises driving an inner drive mass and sensing the slave mass comprises sensing an outer slave mass as defined by the geometry of the gyroscope.

27. The method of claim 16 where the drive mass is fabricated to lie in a plane and has at least one window defined therein, and where driving the drive mass with the drive electrodes comprises driving drive electrodes in the plane of the drive mass, which drive electrodes are disposed in the at least one window.

28. The method of claim 27 where the slave mass is fabricated to lie in a plane and has at least one window defined therein, and where sensing the slave mass with the sense electrodes comprises sensing the slave made in the plane of the slave mass, which slave electrodes are disposed in the at least one window.

29. The method of claim 16 where the slave mass is fabricated to lie in a plane and has at least one window defined therein, and where sensing the slave mass with the sense electrodes comprises sensing the slave made in the plane of the slave mass, which slave electrodes are disposed in the at least one window.

30. The method of claim 16 where the sense and drive electrodes each have a gap spacing between adjacent electrodes, further comprising a gap spacing for the sensing electrodes is greater than the gap spacing for the drive electrodes.

* * * * *